United States Patent
Treudt (10) Patent No.: US 12,030,376 B2
(45) Date of Patent: Jul. 9, 2024

(54) STRUCTURE FOR REDUCING SLOSHING NOISES, DEVICE AND METHOD FOR PRODUCING A STRUCTURE

(71) Applicant: KAUTEX TEXTRON GMBH & CO. KG, Bonn (DE)

(72) Inventor: Volker Treudt, Windeck (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 930 days.

(21) Appl. No.: 16/608,353

(22) PCT Filed: Apr. 16, 2018

(86) PCT No.: PCT/EP2018/059689
§ 371 (c)(1),
(2) Date: Oct. 25, 2019

(87) PCT Pub. No.: WO2018/197250
PCT Pub. Date: Nov. 1, 2018

(65) Prior Publication Data
US 2021/0101476 A1 Apr. 8, 2021

(30) Foreign Application Priority Data

Apr. 25, 2017 (DE) .................. 10 2017 108 848.2

(51) Int. Cl.
*B60K 15/03* (2006.01)
*B29C 48/00* (2019.01)
(Continued)

(52) U.S. Cl.
CPC .......... *B60K 15/077* (2013.01); *B29C 48/001* (2019.02); *B29C 65/18* (2013.01);
(Continued)

(58) Field of Classification Search
CPC ... B29C 48/001; B29C 65/18; B29C 65/7891; B29C 65/7894; B29C 65/0042;
(Continued)

(56) References Cited

U.S. PATENT DOCUMENTS 2,305,923 A * 12/1942 Held ................. B65D 25/02
220/88.1
2,399,258 A * 4/1946 Taylor ................. D04H 3/16
156/193

(Continued)

FOREIGN PATENT DOCUMENTS

DE 3912773 7/1990
DE 69002563 2/1994
(Continued)

OTHER PUBLICATIONS

English translation of International Search Report received in corresponding PCT Application No. PCT/EP2018/059689, dated Oct. 24, 2018.
(Continued)

*Primary Examiner* — Gideon R Weinerth
(74) *Attorney, Agent, or Firm* — Grossman, Tucker, Perreault & Pfleger, PLLC (57) ABSTRACT

Structure for reducing sloshing noises, said structure being provided for disposal in a liquids container for a motor vehicle, having a random arrangement of mutually interlinked threads, wherein a plurality of the threads at least in portions are connected in a materially integral manner to at least one or a plurality of further threads of the structure, wherein the structure has at least one side in the region of which a planar cover of the random arrangement of mutually interlinked threads is provided at least in portions.

18 Claims, 3 Drawing Sheets

(51) Int. Cl.
*B29C 65/00* (2006.01)
*B29C 65/18* (2006.01)
*B29C 65/78* (2006.01)
*B60K 15/077* (2006.01)

(52) U.S. Cl.
CPC ...... *B29C 65/7891* (2013.01); *B29C 65/7894* (2013.01); *B29C 66/0042* (2013.01); *B29C 66/0342* (2013.01); *B29C 66/135* (2013.01); *B29C 66/431* (2013.01); *B29C 66/69* (2013.01); *B29C 66/81463* (2013.01); *B29C 2793/009* (2013.01); *B60K 2015/03032* (2013.01); *B60K 2015/0775* (2013.01); *B60Y 2306/09* (2013.01)

(58) Field of Classification Search
CPC .................. B29C 49/20; B60K 15/077; B60K 2015/0344; B60K 2015/0775; B60K 2015/03467; B60K 2015/0777; B65D 90/52; D04H 3/05; D04H 3/08; D04H 3/10; D04H 3/14; D04H 3/16; D04H 1/559; Y10S 220/24; B26F 3/12
USPC .............. 220/563, 501, 734; 296/146.12, 96, 296/146.1, 39, 1; 156/296, 308.4, 251, 156/168, 167, 181, 244.27; 442/391, 442/334; 264/210.8
See application file for complete search history.

(56) References Cited

U.S. PATENT DOCUMENTS

| | | | | |
|---|---|---|---|---|
| 2,438,156 A * | 3/1948 | Dodge | .................... | D04H 11/00 493/344 |
| 3,349,953 A | 10/1967 | Conaway et al. | | |
| 3,650,431 A * | 3/1972 | Stewart | .................. | B64D 37/32 220/900 |
| 3,691,004 A * | 9/1972 | Werner et al. | ........... | D04H 3/16 156/181 |
| 3,837,988 A * | 9/1974 | Hennen et al. | ......... | B32B 27/12 156/181 |
| 3,936,337 A * | 2/1976 | Stapp | ..................... | D04H 3/009 156/181 |
| 4,227,350 A * | 10/1980 | Fitzer | .................... | B24D 11/005 51/297 |
| 4,294,279 A * | 10/1981 | Wyeth | .................... | B64D 37/32 220/900 |
| 4,301,560 A * | 11/1981 | Fraige | .................... | A47C 27/085 5/687 |
| 4,483,727 A * | 11/1984 | Eickman | .................. | D01F 6/04 156/181 |
| 4,523,343 A * | 6/1985 | Fraige | .................... | A47C 27/085 428/300.1 |
| 4,688,284 A * | 8/1987 | Wride | .................... | A47C 27/088 5/684 |
| 4,844,974 A * | 7/1989 | McCullough, Jr. | .... | B65D 90/52 428/920 |
| 4,859,516 A * | 8/1989 | Yamanaka | ............ | B32B 37/153 442/337 |
| 4,891,000 A * | 1/1990 | Ishii | ........................ | B29C 49/20 264/516 |
| 4,913,757 A * | 4/1990 | Yamanaka | ........... | D06N 3/0002 156/181 |
| 4,952,265 A * | 8/1990 | Yamanaka | ........... | D06N 3/0002 156/169 |
| 4,974,743 A * | 12/1990 | Sasaki | .................. | B60K 15/077 220/88.1 |
| 5,031,795 A | 7/1991 | Kotera et al. | | |
| 5,194,212 A * | 3/1993 | Bonnett | .................. | B29C 70/44 264/516 |
| 5,308,573 A * | 5/1994 | Hirakawa | ............... | B29C 49/20 264/516 |
| 5,464,491 A * | 11/1995 | Yamanaka | ............... | D04H 3/02 156/181 |
| 5,620,541 A * | 4/1997 | Herzberg | ............... | D04H 1/559 19/163 |
| 5,733,825 A * | 3/1998 | Martin | ...................... | D01F 8/06 442/364 |
| 5,932,331 A * | 8/1999 | Jones | .................. | B60R 13/0243 296/146.7 |
| 6,378,150 B1 * | 4/2002 | Minegishi | ................ | D04H 3/07 5/652 |
| 6,408,979 B1 * | 6/2002 | Forbes | .................... | G10K 11/16 181/198 |
| 6,669,265 B2 * | 12/2003 | Tilton | .................. | G10K 11/162 296/39.1 |
| 6,966,401 B2 * | 11/2005 | Kojima | ................ | B60K 15/077 220/734 |
| 7,157,137 B2 * | 1/2007 | Wenstrup | ................. | D04H 1/54 442/364 |
| 7,928,025 B2 * | 4/2011 | Shipley | ................. | D04H 1/558 428/218 |
| 8,194,879 B2 * | 6/2012 | Ishikawa | ............. | B60R 13/0815 381/345 |
| 8,235,241 B2 * | 8/2012 | Ramsay | ............... | B60K 15/077 220/563 |
| 9,194,066 B2 * | 11/2015 | Takaoka | ............... | B29C 48/18 |
| 9,334,593 B2 * | 5/2016 | Sasaki | ..................... | B29B 13/04 |
| 9,528,209 B2 * | 12/2016 | Takaoka | ............... | D01D 10/00 |
| 10,328,618 B2 * | 6/2019 | Takaoka | ................. | B29C 48/06 |
| 2003/0015537 A1* | 1/2003 | Konja | .................. | B60K 15/077 137/574 |
| 2003/0124940 A1* | 7/2003 | Michael | ................ | B29C 43/006 442/415 |
| 2006/0254855 A1* | 11/2006 | Loftus | ...................... | E04B 1/84 181/293 |
| 2012/0042452 A1* | 2/2012 | Takaoka | ............... | A47C 31/006 5/691 |
| 2012/0180939 A1* | 7/2012 | Takaoka | ............... | D04H 3/02 156/181 |
| 2012/0328722 A1* | 12/2012 | Takaoka | ............... | B29C 48/303 425/71 |
| 2013/0101805 A1* | 4/2013 | Altshuler | ................ | B32B 3/266 264/109 |
| 2014/0035191 A1* | 2/2014 | Takaoka | ................ | D04H 3/011 264/210.8 |
| 2014/0037908 A1* | 2/2014 | Takaoka | ............... | B29C 48/345 428/171 |
| 2015/0284894 A1* | 10/2015 | Takaoka | ............... | A47C 27/121 442/50 |
| 2016/0174725 A1* | 6/2016 | Takaoka | ............... | A47C 27/006 5/652.1 |
| 2018/0071963 A1* | 3/2018 | Dhaussy | ............. | B29C 44/1271 |
| 2019/0118646 A1* | 4/2019 | Treudt | .................... | B29C 49/20 |
| 2020/0299877 A1* | 9/2020 | You | .......................... | D04H 3/16 |
| 2021/0101476 A1* | 4/2021 | Treudt | ................. | B60K 15/077 |

FOREIGN PATENT DOCUMENTS

| | | | | |
|---|---|---|---|---|
| DE | 102016207476 A1 | | 11/2017 | |
| DE | 102016223813 A1 * | | 5/2018 | .......... B29C 43/361 |
| DE | 102016223813 A1 | | 5/2018 | |
| GB | 2231384 | | 11/1990 | |
| JP | 2004322996 A | * | 11/2004 | |
| JP | 2006-171504 | | 6/2006 | |
| JP | 2006175906 A | * | 7/2006 | |
| WO | 89/02397 | | 3/1989 | |
| WO | 2006/126162 | | 11/2006 | |
| WO | WO-2017186471 A1 * | | 11/2017 | ............. B29C 49/20 |

OTHER PUBLICATIONS

English translation of International Preliminary Report on Patentability received in corresponding PCT Application No. PCT/EP2018/059689, dated Jul. 11, 2019.

(56) References Cited

OTHER PUBLICATIONS

Office Action from related Chinese Appln. No. 201880042496.5, dated May 7, 2020. English translation attached.

* cited by examiner

STRUCTURE FOR REDUCING SLOSHING NOISES, DEVICE AND METHOD FOR PRODUCING A STRUCTURE

FIELD

The invention relates to a structure for reducing sloshing noises, said structure being provided for disposal in a liquids container for a motor vehicle, having a random arrangement of mutually interlinked threads, wherein a plurality of the threads at least in portions are connected in a materially integral manner to at least one or a plurality of further threads of the structure. The invention furthermore relates to a device and to a method for producing a structure.

BACKGROUND

A structure for reducing sloshing noises of the type mentioned at the outset has the advantage that the damping properties of said structure on account of the random arrangement of mutually interlinked threads is directionally independent, in particular in comparison to cross-laid structures, woven fabrics, or warp/weft knitted fabrics, the thread structure thereof following in each case a predefined order.

In as far as a structure mentioned at the outset, having a random arrangement of mutually interlinked threads, is exposed to increased thermal input, there is the risk that the materially integral connections between the individual threads are released and the structure tears or is at least destroyed in a localized manner Such a thermal input into the structure can take place, for example, in the production of a liquids container for a motor vehicle.

A structure for reducing sloshing noises for example during a blow-molding procedure can thus be joined with a wall of a liquids container at the first temperature. That is to say that the structure is connected to a wall of a liquids container while the wall still has the residual temperature from the preceding extrusion and is in the plasticized state.

The structure herein is exposed to hot blower air, wherein blower air that is reflected by the wall is further heated on account of contact with the as yet still plasticized wall. The blower air that is reflected by the wall can therefore in particular lead to a partial disintegration of the structure, since the blower air that is reflected by the wall can flow through the structure disposed in the region of the wall, and can disintegrate said structure in a localized manner. On account thereof, the damping properties of the structure are reduced and malfunctions of valves, lever-arm sensors, and other active and passive functional units disposed in an interior space of the liquids container can arise.

Proceeding from the prior art described above, the present invention is based on the technical object of specifying a structure for reducing sloshing noises, a device, and a method for producing a structure, said structure, said device, and said method not having the disadvantages described above, or at least having said disadvantages to a lesser extent, wherein a more heat resistant structure for a blow-molding process can in particular be specified.

SUMMARY

According to a first aspect, the invention relates to a structure for reducing sloshing noises, said structure being provided for disposal in a liquids container for a motor vehicle, having a random arrangement of mutually interlinked threads, wherein a plurality of the threads at least in portions are connected in a materially integral manner to at least one or a plurality of further threads of the structure. The structure has at least one side in the region of which a planar cover of the random arrangement of mutually interlinked threads is provided at least in portions.

The cover can serve for partially shielding the structure against the ingress of blower air during a joining procedure, in particular for shielding against reflected blower air. For example, the planar cover can be disposed in such a manner that a reflected blower air when joining the structure during a blow-molding procedure described at the outset impacts the planar cover, and a flow passing through the structure is thus at least partially prevented. In other words, the ingress of blower air, in particular reflected blower air, into the structure can at least be minimized.

"Random arrangement" herein means that the threads of the structure are disposed relative to one another so as not to follow any predefined order, such as would be characteristic for woven fabrics, knitted fabrics, or warp/weft knitted fabrics, for example. Rather, the threads of the structure form a chaotic thread entanglement, or are intertwined so as to be bunched in a random spatial arrangement. In other words, the threads are interlinked in the manner of a random spatial wire mesh structure.

A plurality of the threads at least in portions can be interlinked in a materially integral manner with at least one or a plurality of further threads of the structure in such a manner that a substantially monolithic structure is formed. "Substantially monolithic" presently means that the random arrangement does not comprise any retrievable loose threads. The threads of the structure are consequently integrated fixedly into the random structure in a form-fitting and/or materially integral manner such that the functionality of valves or lever-arm sensors which can be disposed in a liquids container is not impeded by individual threads released from the structure.

According to one further design embodiment, each thread of the structure can be connected in a materially integral manner to at least one or a plurality of further threads of the structure. The threads in this case form a monolithic structure such that none of the threads can be released in a non-destructive manner from the random structure.

The random arrangement of mutually interlinked threads can be constructed substantially from a multiplicity of individual plastics material threads which can be produced from PE (polyethylene) or PP (polypropylene). The plastics material threads can be constructed in multiple layers, wherein a core thread can be sheathed with one or a plurality of further plastics materials, for example. Alternatively or additionally, the threads can be configured so as to be hollow and thus tubular, so as to achieve a high stiffness of the structure and at the same time a reduced weight and material input.

More than 90%, preferably more than 95%, furthermore preferably more than 98%, of the threads of the structure can be connected in a materially integral manner to one or a plurality of further threads of the structure.

The number of connection points can be determined in a non-destructive manner by imaging methods such as raster electron microscopy (REM), or by computed tomography (CT). Furthermore, destroyed materially integral connection points on individual threads can be verified by releasing the threads from the structure.

It can be provided that the structure does not have any suction effect in relation to a liquid stored in a container, in particular no suction effect, or substantially capillary effect, respectively, in relation to a fuel stored in a fuel tank.

It can be provided that each thread of the structure is connected in a materially integral manner to at least one or a plurality of further threads of the structure. The threads in this case form a monolithic structure such that none of the threads can be released in a non-destructive manner from the structure.

A multiplicity of randomly arranged connection points, in particular local welds of intersecting threads, can be provided within the structure.

The structure can have threads of dissimilar thread thicknesses or diameters, wherein the threads in a first region of the structure can in particular have a larger diameter than in a second region. This can be achieved in that recesses of dissimilar diameters are provided in a die for shaping the thread matrix. In this way, the structure can have regions of dissimilar stiffnesses. For example, a region which is provided for linking the structure to a wall of a liquids container can have threads of a larger diameter than in a region which in the completed state faces away from the wall. The structure in the manner of a sandwich material can thus have structural layers of dissimilar stiffnesses and/or densities.

Alternatively or additionally, the structure can have threads of dissimilar materials, wherein the threads in a first region are in particular produced from a first material, and the threads in a second region are produced from a second material. This can be achieved in that dissimilar materials are fed to a die for shaping the threads of the structure. For example, a region which is provided for linking the structure to the wall of a liquids container can comprise threads from a first material, and in a region which in the completed state faces away from the wall comprise threads from a second material. The structure in the manner of a sandwich material can thus have structural layers of dissimilar materials.

The structure can be produced in a single layer or multiple layers from one or a plurality of plastics materials. The structure can be constructed substantially from a multiplicity of individual plastics material threads which can be produced from PE (polyethylene) or PP (polypropylene). The plastics material threads can be constructed in multiple layers, wherein, for example, a core thread can be sheathed with one or a plurality of further plastics materials. Alternatively or additionally, the threads can be configured so as to be hollow and thus tubular so as to achieve a high stiffness of the structure and that the same time a low weight and material input.

It can be provided that the planar cover at least in part or completely is provided by the fastening of a cover element which is provided separately from the random arrangement of mutually interlinked threads. For example, a material that is more heat resistant in comparison to the material of the threads can be used to this end so as to at least partially shield the random arrangement of mutually interlinked threads in relation to the ingress of lower air, for example.

According to one further design embodiment of the structure it is provided that the planar cover has been formed in that threads assigned to the at least one side at least in portions have been fused and/or welded to one another so as to form the planar cover. Accordingly, the planar cover can be at least in part established by welding and/or fusing the threads so as to form the planar cover. The planar cover can thus be produced at least in part without any additional material input in a cost-effective manner Additionally, a separate cover element that has already been described above can be provided.

According to one further design embodiment the planar cover can be composed completely from the material of the threads such that the planar cover has been established completely by welding and/or fusing the threads so as to form the planar cover. The planar cover can thus be produced in a cost-effective manner without any additional material input.

It can be provided that the at least one side of the structure is spanned in a substantially complete manner by the planar cover. When a planar cover which spans the at least one side in a substantially complete manner is presently mentioned, said planar cover can thus have some or a plurality of gaps or passage openings, that is to say some or a plurality of gaps or free peripheries. In this case, an ingress of blower air that impacts the structure in the region of said side during a joining procedure can be largely but not completely prevented.

Alternatively, it can be provided that the at least one side of the structure is covered across the entire area and without any gaps by the planar cover. In this case, the cover is formed as a completely closed shield which prevents an ingress of blower air that impacts the structure in the region of said side during a joining procedure.

It can be provided that at least one web which has a separation face along which the structure has been assembled is provided, wherein the web is part of the planar cover, and/or wherein the web is contiguous to the planar cover.

With the aid of the web, assembling of the structure can be performed without individual threads of the structure being severed, said severed threads in the completely fitted state of the structure potentially being released from the structure and potentially being able to impede the function of a liquids container.

The web and/or the separation face can be configured from solid material and/or so as to be closed across the entire area. For example, the web can have been produced by fusing or refusing, respectively, and/or welding of threads of the structure. It can be avoided on account thereof that free thread ends which can impede the ease of handling of the structure are created in the region of a separation location along which the structure has been cut.

The web can be formed so as to be protruding and at least in portions project beyond a side of the structure. It can thus be ensured that assembling of the structure is performed at a spacing from the random arrangement of mutually interlinked threads, and the cutting of individual threads that are contiguous to the web is avoided.

For example, the structure can occupy a substantially cuboid volume. In other words, an envelope of the random arrangement of mutually interlinked threads including the planar cover can occupy a substantially cuboid volume. The web can extend so as to protrude beyond an end face and/or a lateral face and/or a cover face which delimit/delimits such a cuboid volume.

According to one further design embodiment of the structure it can be provided that at least two planar covers which are disposed on sides of the structure that face away from one another are provided. An at least partial shielding of the random structure of mutually interlinked threads can thus be performed on at least two sides. It can be provided that the structure has precisely two planar covers. It can be provided that the structure has three or more planar covers.

In as far as the structure occupies a substantially cuboid volume, the covers can be disposed, for example, in the region of two end sides of the cuboid volume that face away from one another. Alternatively or additionally, one or a plurality of covers can be disposed in the region of the longitudinal sides and/or cover faces of the cuboid volume.

It can be provided that the structure has a local compression of the threads. A flow of blower air through the structure in this region during the fitting of the structure can be reduced on account thereof, or an ingress of blower air into the structure can be reduced.

It can be provided that the structure in a volumetric portion that is contiguous to a longitudinal side and/or an end side and/or a cover side has a higher thread density than in an inner volumetric portion that is contiguous to the volumetric portion of higher thread density. On account thereof, a flow of blower air through the structure in this region during the fitting of the structure can be reduced, or an ingress of blower air into the structure can be reduced.

A volumetric portion of higher thread density can be disposed, for example, between the cover and the inner volumetric portion so as to at least in part shield the inner volumetric portion.

The structure can be substantially cuboid, or occupy or fill, respectively, a substantially cuboid volume, respectively. The planar cover can be provided, for example, in the region of an end side or in the region of two end sides that face away from one another. A volumetric portion of higher thread density can be provided in the region of a longitudinal side or a cover side that is contiguous to an end side.

For example, two volumetric portions of higher thread density can have a mutual spacing and contain an inner volumetric portion of lower thread density. In combination with one or a plurality of planar covers in the region of these or further sides, the ingress of blower air into the structure can be minimized.

It can be provided that more than 50% of a side of the random arrangement of mutually interlinked threads is covered by the planar cover. For example, this herein can be a side of a substantially cuboid structure, wherein the random arrangement of mutually interlinked threads defines a substantially cuboid volume, or an envelope of the random arrangement of mutually interlinked threads is substantially cuboid, respectively.

It can be provided that more than 70%, in particular more than 90%, of a side of the random arrangement of mutually interlinked threads is covered by the planar cover, so as to shield the random arrangement of mutually interlinked threads in relation to hot blower air, for example.

According to a second aspect, the invention relates to a device for producing a structure, having an extrusion device for producing a random arrangement of mutually interlinked threads, wherein a plurality of the threads at least in portions are connected in a materially integral manner to at least one or a plurality of further threads, and having at least one post-processing installation which is specified for producing an at least in portions planar cover on at least one side of the structure.

The extrusion device can be specified for continuously extruding the random arrangement of mutually interlinked threads.

The extrusion device can be specified for extruding the random arrangement of mutually interlinked threads, for example as mat goods, having a substantially rectangular cross section when viewed transversely to an extruding direction.

The extrusion device can be specified for initially melting a plastics material granulate so as to form a homogenous plastics material compound that is capable of being extruded. The plastics material compound can be capable of being pressed by an extruder, for example through a die, which can have a grid or a matrix, respectively, of mutually spaced openings. The openings can be circular, for example.

The plastics material compound by passing the die can be separated into a multiplicity of mutually spaced apart, continuously extruded individual threads which, in particular in the case of a vertical extruding direction, can run in a substantially mutually parallel manner. The thread matrix formed in this manner can be shaped so as to form the random arrangement of mutually interlinked threads in that, for example, individual threads are deflected transversely to the extruding direction and adhesively bonded or welded, respectively, to neighboring threads. It can already suffice herein for individual threads of an extruded thread matrix that has been continuously extruded as parallel individual threads, for example, be deflected so as to initiate an intertwining or intermingling, respectively, of the thread matrix across the entire matrix cross section. As soon as the still plasticized plastic material threads touch one another in the region of the external shell faces thereof, a material integral connection between the respective threads is configured in said contact region. After the interlinking of the threads, the random arrangement thus created can be cooled in a water bath or the like so as to fix in terms of the shape thereof a random mesh structure having local materially integral thread connections.

The post-processing installation can be specified for fastening a cover element that is provided separately from the random arrangement of mutually interlinked threads to at least one side of the random arrangement of mutually interlinked threads.

It can be provided that the post-processing installation has a heating device which is specified for fusing and/or welding threads of the structure so as to form the at least in portions planar cover, wherein the heating device in particular has one heating mirror. A cost-effective production of the cover can thus be provided in that threads are pressed onto the heating mirror or onto a plate that bears on the heating mirror, and are fused or refused, respectively, so as to form the planar cover, and/or are welded so as to form the planar cover.

The heating mirror, in particular for compressing the random arrangement of mutually interlinked threads during a thermal input, is movable along an extruding direction and counter to an extruding direction of the random arrangement of mutually interlinked threads. The heating mirror can in particular be movable parallel to an extruding direction of the random arrangement of mutually interlinked threads. In the operation of the device, the heating mirror can therefore be actuated in the direction of the random arrangement of mutually interlinked threads that is extruded by the extrusion device.

The heating mirror can be actuated in the direction of the random arrangement of mutually interlinked threads such that said random arrangement is simultaneously compressed and heated by the heating mirror.

The post-processing installation can have a cooling device which is specified for cooling threads that have been fused and/or welded so as to form the at least in portions planar cover, wherein the cooling device has in particular one cooling mirror. The planar cover in terms of the shape thereof can be fixed with the aid of the cooling device in that the refused and/or welded thread material solidifies on account of the outflow of heat. Moreover, non-destructive releasing or lifting, respectively, of the structure from the post-processing installation can be achieved on account of the cooling. The cooling can be achieved in that the planar cover is pressed onto the cooling mirror or onto a plate that bears on the cooling mirror.

The heating device can be specified for heating the threads to a temperature above the melting temperature of said threads.

The cooling device can be specified for cooling the threads that have been fused or refused, respectively, and/or welded so as to form the planar cover to a temperature below the melting temperature of said threads.

The heating installation and the cooling installation can be integrated in a single plate. A combination of the heating mirror and the cooling mirror can thus be provided so as to generate a temperature change.

The cooling mirror can be movable along an extruding direction and counter to an extruding direction of the random arrangement of mutually interlinked threads. The cooling mirror can in particular be movable parallel to an extruding direction of the random arrangement of mutually interlinked threads. In the operation of the device, the cooling mirror can therefore be actuated in the direction of the random arrangement of mutually interlinked threads that is extruded by the extrusion device.

In order to avoid any adhesion of the threads on the post-processing installation, the post-processing installation can have at least one anti-stick layer which is provided for bearing on the random arrangement of mutually interlinked threads, and which is specified for supplying heat by way of the heating device and/or for discharging heat by way of the cooling device.

An anti-stick layer and/or an anti-stick coating can be provided on the heating mirror.

An anti-stick layer and/or an anti-stick coating can be provided on the cooling mirror.

It can be provided that an anti-stick installation is provided separately from a heating installation and/or a cooling installation.

According to one further design embodiment of the invention it is provided that the anti-stick layer is provided on a plate which is movable relative to a heating device and/or a cooling device, in particular transversely to an extruding direction of the random arrangement of mutually interlinked threads.

The plate provided with the anti-stick layer is provided for being brought to bear on the random arrangement of mutually interlinked threads so as to enable indirectly a thermal input of the heating installation and/or a thermal output by way of the cooling device.

The plate provided with the anti-stick layer on one side can be capable of being brought to bear on the heating installation, and on a side facing away therefrom can be capable of being brought to bear on the random arrangement of mutually interlinked threads.

It can be provided that for heating a heating installation is initially brought into contact with the plate provided with the anti-stick layer. The heating installation can subsequently be removed, and the cooling installation can be brought into contact with the plate provided with the anti-stick layer.

Alternatively or additionally, the plate provided with the anti-stick layer on one side can be capable of being brought to bear on the cooling installation, and on a side that faces away therefrom can be capable of being brought to bear on the random arrangement of mutually interlinked threads.

The post-processing installation has at least one separation installation for assembling the structure. The structure can thus be assembled in particular to the size envisaged for the final fitting, for example by way of a separation installation for punching or cutting.

One further design embodiment of the device is distinguished in that an installation for guiding and directing the extruded random arrangement of mutually interlinked threads is provided, having a deflection installation for deflecting once, twice, or multiple times, the extruded random arrangement of mutually interlinked threads, wherein the deflection installation is in particular specified for deflecting the extruded random arrangement of mutually interlinked threads substantially at least in portions in a meandering manner.

The deflection installation can be assigned one or a plurality of heating installations so as to refuse and/or weld the random arrangement of mutually interlinked threads simultaneously at two or more locations so as to form a planar cover.

Alternatively or additionally to the deflection installation, the installation for guiding and directing can have a buffer installation which is specified for diverting the extruded random arrangement of mutually interlinked threads transversely to the extruding direction so as to release an additional extrusion path. Discontinuous welding and/or refusing of the threads can thus be performed while the random arrangement of mutually interlinked threads continues to be continuously extruded into the buffer accumulator, on account of which a backlog of said random arrangement of mutually interlinked threads in the region of a heating installation can be avoided.

At least two or more post-processing installations can be provided. The number of heating installations can be adapted to the envisaged extruding rate and to the welding time such that continuous extruding at a constant rate can be achieved.

According to a third aspect, the invention relates to a method for producing a structure, comprising the following method steps:
 extruding and interlinking threads so as to form a random arrangement of mutually interlinked threads, wherein a plurality of the threads at least in portions are connected in a materially integral manner to at least one or a plurality of further threads;
 producing an at least in portions planar cover on at least one side of the structure.

When extruding, a plastics material granulate can initially be fused so as to form a homogenous plastics material compound that is capable of being extruded. The plastics material compound by means of an extruder can be pressed, for example, through a dye which can have a grid or a matrix, respectively, of mutually spaced apart openings. The openings can be circular, for example.

By passing the matrix, the plastics material compound can be separated into a multiplicity of mutually spaced apart, continuously extruded individual threads which, in particular in the case of a vertical extruding direction, can run in a substantially mutually parallel manner.

The thread matrix by interlinking can be shaped so as to form the random arrangement of mutually interlinked threads in that, for example, individual threads are deflected transversely to the extruding direction and adhesively bonded or welded, respectively, to neighboring threads.

It can already suffice herein for individual threads of a thread matrix that has been continuously extruded as parallel individual threads, for example, to be deflected so as to initiate an intertwining or intermingling, respectively, of the thread matrix across the entire matrix cross section. As soon as the still plasticized plastic material threads touch one another in the region of the external shell faces thereof, a material integral connection between the respective threads is configured in said contact region. After the interlinking of the threads, the random structure thus created can be cooled in a water bath or the like so as to fix in terms of the shape thereof a random mesh structure having local materially integral thread connections.

After the structure emerges from a water bath, drying of the structure, in particular air-drying, can be performed.

According to one further design embodiment of the method it is provided that the producing of an at least in portions planar cover on at least one side of the structure is performed by fusing and/or welding threads of the structure so as to form the at least in portions planar cover.

According to one further design embodiment of the method is provided that the fusing of the threads of the structure so as to form the at least in portions planar cover is performed by placing the threads so as to bear on a heating device.

According to one further design embodiment of the method it is provided that cooling by a cooling device is performed after the fusing and/or welding of the threads.

The threads can have an adhesion to a heating tool that is higher than the mutual cohesion of said threads. Destruction-free lifting from a heating installation and/or a plate provided with an anti-stick layer can be achieved by cooling in combination with an anti-stick layer. The plate having the anti-stick coating can serve as a heat transmission element during a heating phase and/or a cooling phase.

According to one further design embodiment of the method it is provided that the heating device and/or the cooling device and/or a heat transmission plate are/is moved in the direction of the random arrangement of mutually interlinked threads so as to be brought to bear on and compress the random arrangement of mutually interlinked threads.

In order for the threads when using critical thermoplastic materials not to continue adhering when lifting the heat transmission plate after a melting and compressing procedure, a corresponding alternating temperature management of the heat transmission plate is required. In this context, a material of which the cohesion is lower than the adhesion of said material in relation to the heat transmission plate is referred to as a critical material. The alternating temperature applies to the contact surface of the heat transmission plate that bears on the threads and is to be managed such that a temperature above the material melting temperature is present when melting and compressing, and a surface temperature below the material melting temperature is achieved just before lifting the contact surface from the melt.

According to one further design embodiment of the method it is provided that the random arrangement of mutually interlinked threads is deflected at least once, in particular at least twice, in particular deflected in a meandering manner, wherein the planar cover is in particular generated by actuating a heating mirror in the direction of a curvature formed by the deflection of the random arrangement of mutually interlinked threads.

According to one further design embodiment of the method it is provided that the random arrangement of mutually interlinked threads is continuously extruded, wherein fusing, refusing, and/or welding of threads is discontinuously performed, wherein the continuously extruded random arrangement of mutually interlinked threads is guided transversely to the extruding direction into a buffer accumulator. A backlog can be prevented on account thereof.

The random arrangement of mutually interlinked threads can at least in part be dried, in particular air-dried, before being supplied to the buffer accumulator.

The buffer accumulator can be depleted after the refusing and/or welding, and the material can be conveyed out of the buffer accumulator and be provided for the next post-processing step. The buffer accumulator is restocked during the next discontinuous post-processing step.

Partial or complete separating of the structure in the region of the web can be performed after the solidification.

BRIEF DESCRIPTION OF THE DRAWINGS

The invention will be described in more detail hereunder by means of a drawing illustrating an exemplary embodiment. In the drawing, in each case in a schematic manner.

DETAILED DESCRIPTION

Figure 1A:
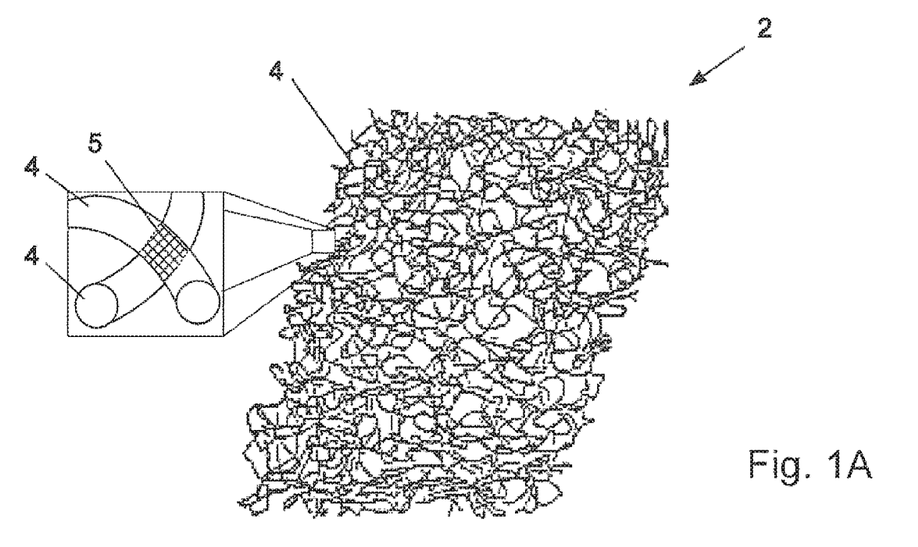
FIGS. 1A, 1B show a structure according to the invention.

FIG. 1 shows a structure 2 for reducing sloshing noises. The structure 2 is provided for disposal in a liquids container for a motor vehicle. The structure 2 has a random arrangement of mutually interlinked threads 4 which in the region of the outer shell faces thereof are locally welded to one another. The enlargement in FIG. 1A shows one such local welding 5.

A plurality of the threads 4 at least in portions is connected in a materially integral manner to at least one or a plurality of further threads 4 of the structure 2.

The structure 2 has at least one side 6 in the region of which at least in portions a planar cover 8 of the random arrangement of mutually interlinked threads 4 is provided.

The planar cover 8 has been formed in that threads 4 assigned to the at least one side 6 have been at least in portions fused and/or welded to each other so as to form the planar cover 8. The planar cover 8 presently is composed of the material of the threads 4. The threads 4 are presently composed of a thermoplastic plastics material.

Figure 1B:
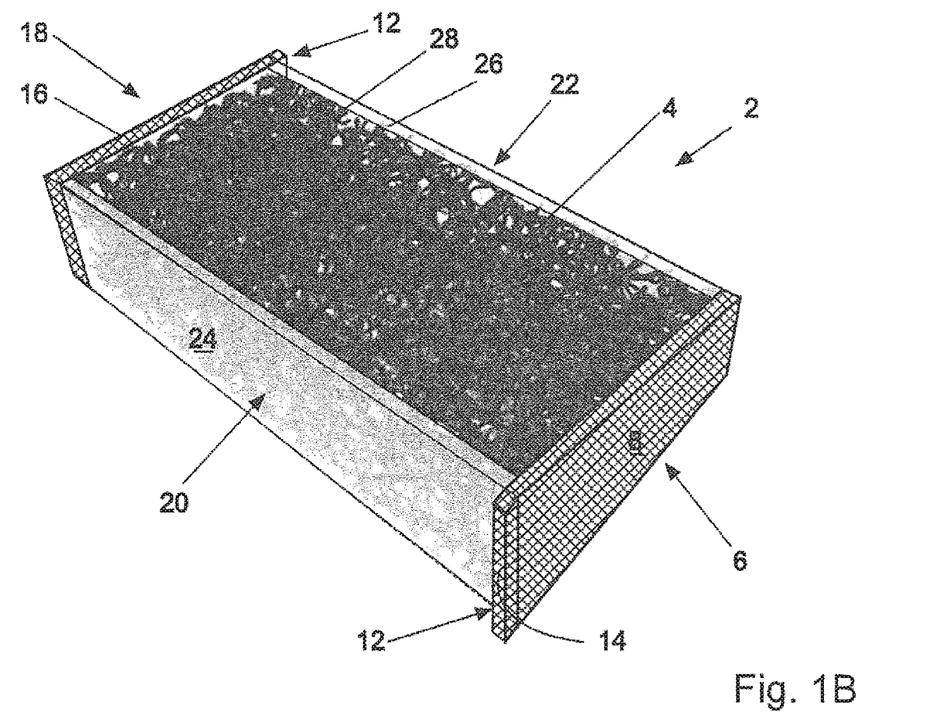

FIG. 1B describes the case in which the at least one side 6 of the structure 2 is covered across the entire area by the planar cover 8. In the case of FIG. 1B, the planar cover 8 of the side 6 is therefore without gaps. According to alternative design embodiments it can be provided that the planar cover has gaps in the region of which the threads have not been welded and/or fused, or refused, respectively, to each other so as to form a continuous face.

A web 12 which has a separation face 14 along which the structure 2 has been assembled is provided.

The web 12 is part of the planar cover 8 and is contiguous to the planar cover 8. The web 12 is presently formed so as to be integral to the planar cover 8 by fusing or refusing, respectively, the threads 4 of the structure 2. The web 12 is composed of a solid material, and the separation face 14 is closed across the entire area.

The structure 2 according to FIG. 1B presently has a second planar cover 16. The second planar cover 16 is disposed on a side 18 of the structure 2 that faces away from the side 6 according to FIG. 1B, and has likewise been formed by fusing or refusing, respectively, and/or welding the threads 4.

The structure 2 according to FIG. 1B in volumetric portions 24, 26 that are contiguous to a longitudinal side 20 and to a longitudinal side 22 has in each case a higher thread density than in an inner volumetric portion 28 that is contiguous to the volumetric portions 24, 26 of higher thread density.

The structure 2 is presently substantially cuboid, or occupies a cuboid volume, respectively.

Figure 2:
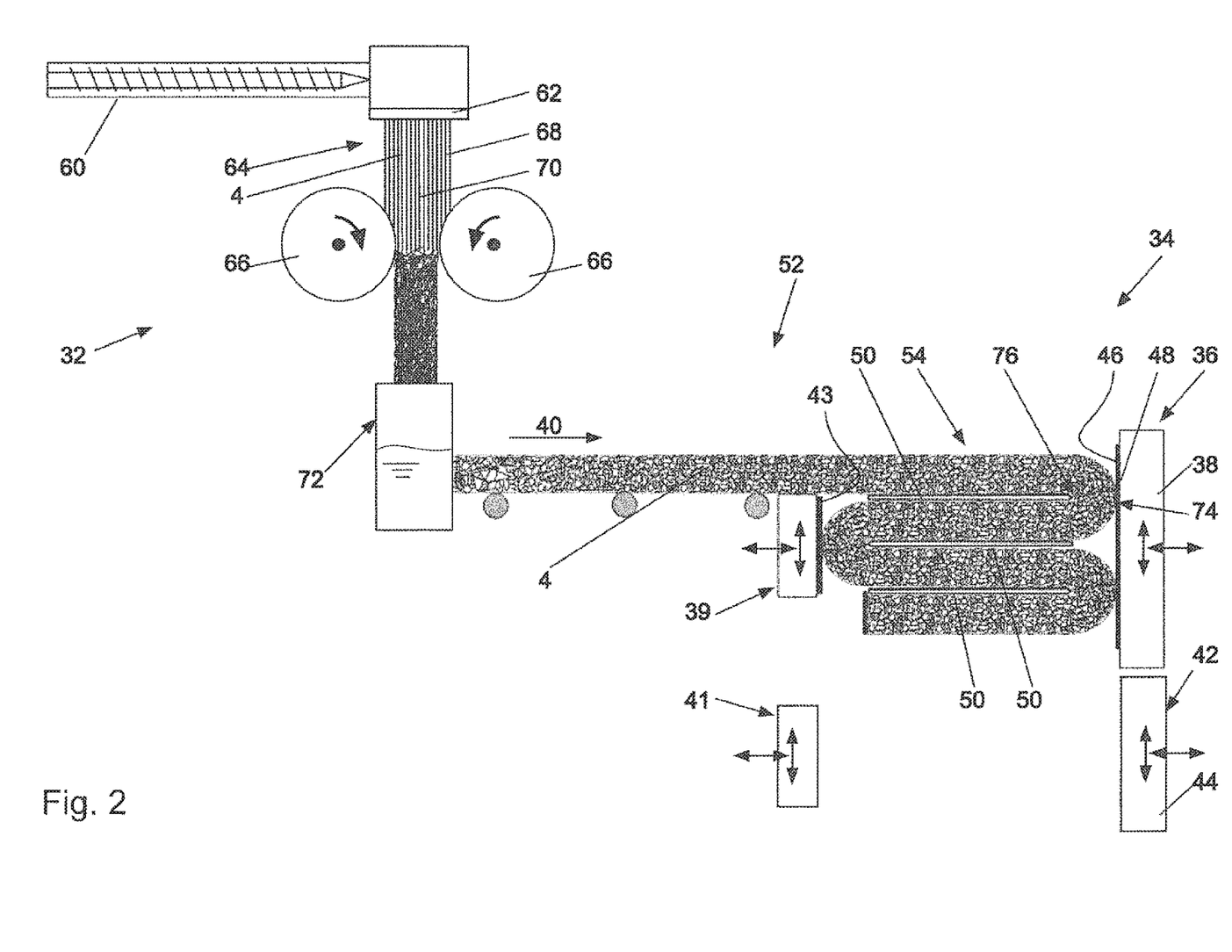
FIG. 2 shows a device and a method for producing a structure.

FIG. 2 shows an extrusion device 32 for producing a random arrangement of mutually interlinked threads 4. In the production of the random arrangement of mutually interlinked threads 4, a plurality of threads 4 at least in portions are connected in a materially integral manner to at least one or a plurality of further threads 4.

A post-processing installation 34 which is specified for producing the at least in portions planar cover 8, 16 of sides 6, 18 of the structure 2 to be produced is provided.

The post-processing installation 34 has a heating device 36. The heating device 36 is specified for fusing and/or welding threads 4 of the structure 2 so as to form the at least in portions planar cover 8, 16. The heating device 36 has a heating mirror 38. The heating mirror 38 is movable along an extruding direction 40, counter to the extruding direction 40, and transversely to the extruding direction 40 of the random arrangement of mutually interlinked threads 4.

The post-processing installation 34 has a cooling device 42 which is specified for cooling threads 4 that have been fused and/or welded so as to form the at least in portions planar cover 8, 16, wherein the cooling device 42 has a cooling mirror 44.

The cooling mirror 44 is movable along an extruding direction 40, counter to the extruding direction 40, and transversely to the extruding direction 40 of the random arrangement of mutually interlinked threads 4.

The post-processing installation 34 has an anti-stick layer 46 which is provided on a plate 48. The anti-stick layer 46 of the plate 48 is provided so as to bear on the random arrangement of mutually interlinked threads 4. A thermal input from the heating device 36 to the random arrangement of mutually interlinked threads takes place by way of the plate 48. A thermal output by way of the cooling device 42 likewise takes place by way of the plate 48.

A further heating installation 39, a further cooling installation 41, and a further heat transmission plate 43 can be provided.

The heating device and the cooling device on a side of the plate 48 that faces away from the thread structure 4 can be brought to bear on the plate so as to effect a temperature change. The heating mirror can thus be removed from the position on the plate 48 illustrated in FIG. 2, wherein the cooling mirror 44 is subsequently brought to bear on the plate 48. The plate 48 acts in each case as a heat transmitting element for the thermal input to the threads 4 for the thermal output from the planar cover 8, 16.

An installation 52 for guiding and directing the extruded random arrangement of mutually interlinked threads 4 is provided. The installation 52 for guiding and directing has a deflection installation 54 which is specified for deflecting in a substantially meandering manner the extruded random arrangement of interlinked threads 4.

The installation 52 for guiding and directing moreover has a buffer installation 56 which is specified for diverting the extruded random arrangement of mutually interlinked threads 4 transversely to the extruding direction 40 so as to release an additional extrusion path 58.

A method for producing a structural 2 will be described hereunder, said method having the following method steps:
extruding and interlinking threads 4 so as to form a random arrangement of mutually interlinked threads 4, wherein a plurality of the threads 4 at least in portions is connected in a materially integral manner to at least one or a plurality of further threads;
producing an at least in portions planar cover on at least one side of the structure.

In order for the random arrangement of mutually interlinked threads 4 to be provided, a plastics material is initially melted in an extruder 60 and guided through a die 62 such that a thread matrix 64 is provided, the threads 4 of said thread matrix 64 running in a mutually parallel manner and having a mutual spacing.

The thread matrix 64 is guided over rollers 66, wherein the rollers 66 have a smaller mutual spacing than the width of the thread matrix. On account thereof, outer threads 68 of the thread matrix are inwardly offset in the direction of inner threads 70 of the thread matrix 64, said outer threads 68 welding in the region of the circumferential shell faces thereof. The arrangement of randomly mutually interlinked threads which are locally welded to one another formed in this way can subsequently be cooled and set, in particular in a water bath 72.

The arrangement of randomly mutually interlinked threads 4 can be set on account of the at least partial cooling. In particular, the random arrangement of mutually interlinked threads 4 can be formed so as to be in particular monolithic. This means that each thread 4 of the random arrangement of mutually interlinked threads 4 is locally welded to at least one further thread 4 in the region of the external shell face thereof, or in any case is not releasable in a non-destructive manner from the structure.

The arrangement of randomly mutually interlinked threads 4 continuously extruded in this way is subsequently fed to post-processing.

Planar covers 8, 16 are produced by fusing and welding threads 4 with the aid of the post-processing installation 34. During the discontinuous welding procedure, the strand of the random arrangement of mutually interlinked threads 4 that continues to be continuously extruded is extruded in an ongoing manner at a constant rate, wherein the material is guided transversely to the extruding direction 40 into the buffer installation 56 so as to avoid a backlog ahead of the post-processing installation 34.

After the discontinuous welding in the region of the post-processing installation 34, the buffer accumulator is depleted again, and the material guided in the loop 58 of the buffer accumulator 56 is fed to the post-processing installation 34.

Figure 3:
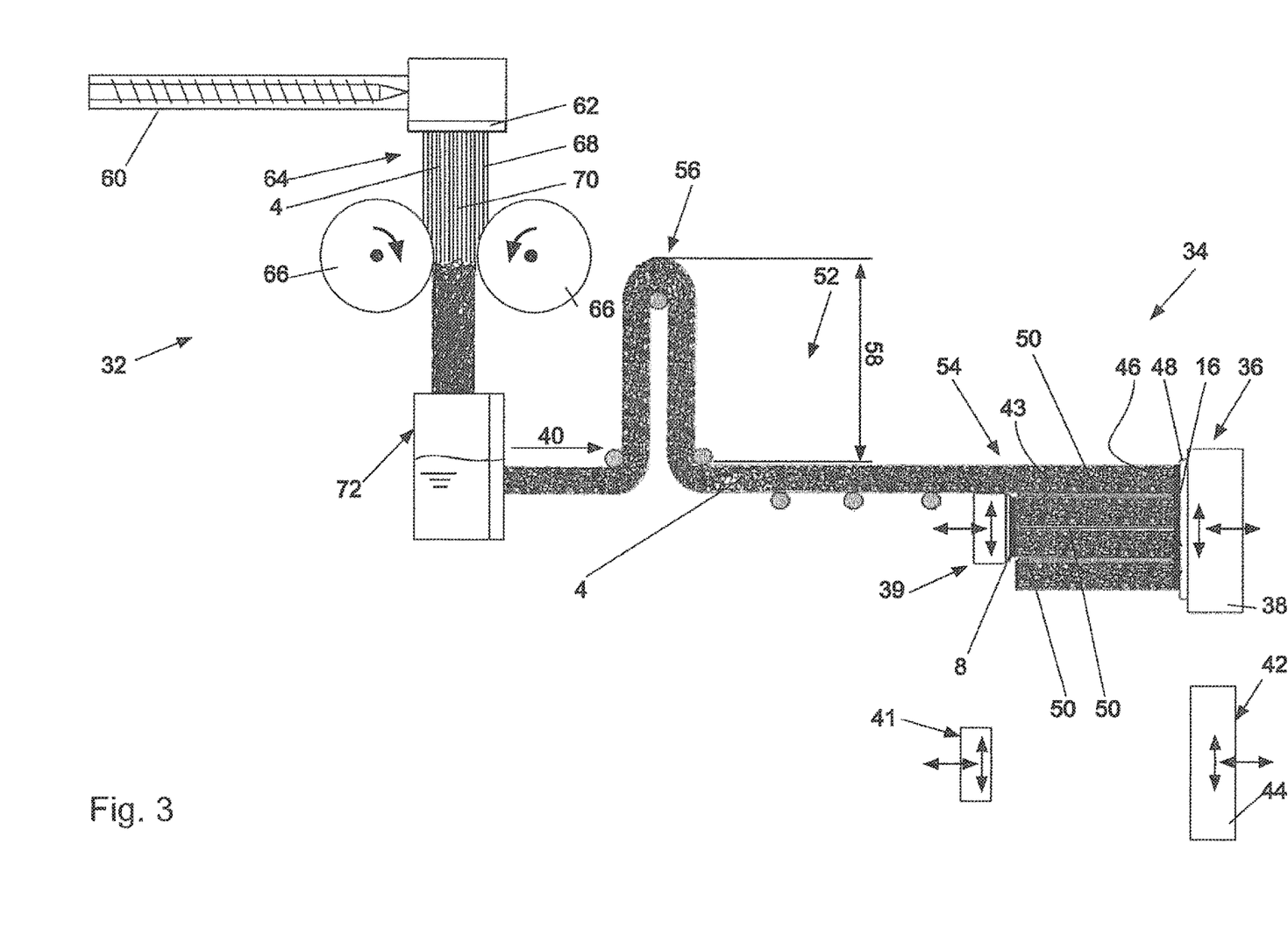
FIG. 3 shows a device and a method for producing a structure.

As is to be derived from the drawing, the continuously extruded arrangement of randomly mutually interlinked threads 4 in the region of the post-processing installation 34 is stacked in a meandering manner such that simultaneous welding of a plurality of planar covers 8, 16 is enabled.

The welding is performed in the region of an outer curvature 74, wherein the respective separation installation 50 is provided on a fold 76 that faces away from the outer curvature. The separation element 50, or the separation installation 50, respectively, can be actuated after the welding or refusing, respectively, of the threads 4 so as to form the planar covers 8, 16, such that only a narrow web 12 from solid material remains.

A structure 2 can subsequently be separated from the continuous material with the aid of the separation installation. Alternatively or additionally, the separating of the structure 2 from the continuous material can be performed by manual cutting, or by a downstream separate cutting installation.

What is claimed is:

1. A baffle structure for a motor vehicle, comprising:
an inner volumetric portion with planar faces, the inner volumetric portion comprising a random arrangement of at least partially interlinked, integrally connected threads, and
at least one planar cover region,
wherein the planar cover region comprises a portion of the threads fused together which form a higher density region of connected threads than in the inner volumetric portion,
wherein the planar cover region has planar dimensions equal to or greater than a longitudinal planar face of the inner volumetric portion,
wherein the baffle structure is cuboid and has two longitudinal sides opposite each other, two cover sides opposite each other and two end sides opposite each other,
wherein a diagonal dimension of each of the two end sides is shorter than a diagonal dimension of each of the two longitudinal sides and a diagonal dimension of each of the two cover sides, and
wherein the planar cover region is provided at both of the end sides.

2. The baffle structure as claimed in claim 1, further comprising:
at least one web which has a separation face along which the baffle structure is assembled,
wherein the web is part of the planar cover region, and/or
wherein the web is contiguous to the planar cover region.

3. The baffle structure as claimed in claim 1, wherein the baffle structure in a volumetric portion that is contiguous to the end side has a higher thread density than in an inner volumetric portion that is contiguous to the volumetric portion of higher thread density.

4. A baffle structure for a motor vehicle, comprising:
an inner volumetric portion with planar faces, the inner volumetric portion comprising a random arrangement of at least partially interlinked, integrally connected threads, and
at least one planar cover region,
wherein the planar cover region comprises a portion of the threads fused together which form a higher density region of connected threads than in the inner volumetric portion,
wherein the planar cover region has planar dimensions equal to or greater than a longitudinal planar face of the inner volumetric portion,
wherein the baffle structure has two longitudinal sides opposite each other, two cover sides opposite each other and two end sides opposite each other,
wherein the baffle structure is an extrudate having a machine direction and a transverse direction,
wherein the two longitudinal sides and the two cover sides extend in the machine direction, and the two end sides extend in the transverse direction, and
wherein the planar cover region is provided at both of the end sides.

5. The baffle structure as claimed in claim 4, further comprising:
at least one web which has a separation face along which the baffle structure is assembled,
wherein the web is part of the planar cover region, and/or
wherein the web is contiguous to the planar cover region.

6. The baffle structure as claimed in claim 4, wherein the baffle structure in a volumetric portion that is contiguous to the end side has a higher thread density than in an inner volumetric portion that is contiguous to the volumetric portion of higher thread density.

7. The baffle structure as claimed in claim 4, wherein:
the baffle structure comprises a plurality of layers of the extrudate, which form a stack on one another.

8. The baffle structure as claimed in claim 7, wherein:
the plurality of layers of the extrudate are folded over one another to form the stack.

9. The baffle structure as claimed in claim 7, wherein:
the plurality of layers of the extrudate which form the stack also form the planar cover region.

10. The baffle structure as claimed in claim 4, wherein:
the integrally connected threads are of a plurality of threads, and comprise more than 90% of the plurality of threads.

11. The baffle structure as claimed in claim 4, wherein:
the integrally connected threads are welded to each other.

12. The baffle structure as claimed in claim 4, wherein:
the planar cover region is formed completely of the integrally connected threads.

13. The baffle structure as claimed in claim 4, wherein:
the threads are formed of thermoplastic.

14. The baffle structure as claimed in claim 4, wherein:
the threads are formed of polyethylene or polypropylene.

15. The baffle structure as claimed in claim 4, wherein:
the baffle structure is a liquid container baffle structure.

16. The baffle structure as claimed in claim 4, wherein:
the baffle structure is a fuel tank baffle structure.

17. A baffle structure for a motor vehicle, comprising:
an inner volumetric portion with planar faces, the inner volumetric portion comprising a random arrangement of at least partially interlinked, integrally connected threads, and
at least one planar cover region,
wherein the planar cover region comprises a portion of the threads fused together which form a higher density region of connected threads than in the inner volumetric portion,
wherein the planar cover region has planar dimensions equal to or greater than a longitudinal planar face of the inner volumetric portion,
wherein the baffle structure has two longitudinal sides opposite each other, two cover sides opposite each other and two end sides opposite each other,
wherein the baffle structure is an extrudate having a machine direction and a transverse direction,
wherein the two longitudinal sides and the two cover sides extend in the machine direction, and the two end sides extend in the transverse direction, and
wherein the planar cover region is provided at one of the end sides by a compressed fold that forms the higher density region of connected threads than in the inner volumetric portion.

18. The baffle structure as claimed in claim 17, wherein:
the compressed fold comprises a curvature compressed as to be planar.

* * * * *